US011372849B2

(12) United States Patent
Liu

(10) Patent No.: US 11,372,849 B2
(45) Date of Patent: Jun. 28, 2022

(54) TRANSACTION CONFIRMATION METHODS AND APPARATUSES IN BLOCKCHAIN NETWORK

(71) Applicant: ALIPAY (HANGZHOU) INFORMATION TECHNOLOGY CO., LTD., Zhejiang (CN)

(72) Inventor: Xiaojian Liu, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/359,619

(22) Filed: Jun. 27, 2021

(65) Prior Publication Data

US 2022/0067032 A1 Mar. 3, 2022

(30) Foreign Application Priority Data

Aug. 28, 2020 (CN) ......................... 202010889845.6

(51) Int. Cl.
*G06F 16/23* (2019.01)

(52) U.S. Cl.
CPC ...... *G06F 16/2379* (2019.01); *G06F 16/2365* (2019.01)

(58) Field of Classification Search
CPC ............. G06F 16/2379; G06F 16/2365; H04L 2209/38; H04L 2209/56; H04L 9/0637
See application file for complete search history.

(56) References Cited

U.S. PATENT DOCUMENTS 10,417,217 B2 9/2019 Pierce et al.
10,574,464 B2 2/2020 Lancashire et al.
(Continued)

FOREIGN PATENT DOCUMENTS

CN 109461079 A 3/2019
CN 110706101 A 1/2020
(Continued)

OTHER PUBLICATIONS

First Search for Chinese Application No. 202010889845.6 dated Oct. 27, 2020.
(Continued)

*Primary Examiner* — Robert W Beausoliel, Jr.
*Assistant Examiner* — Mohammad Solaiman Bhuyan

(57) ABSTRACT

Embodiments of this specification provide transaction confirmation methods and apparatuses. An example method includes: in response to detecting an event indicating that one of multiple nodes has persistently stored a batch of transactions or executed transactions of a subbatch of transactions, determining a current latest subbatch of subbatches of transactions for which the multiple nodes have confirmed; determining a target subbatch according to the current latest subbatch; determining a first quantity of the multiple nodes that have generated execution results that are consistent with an execution result of the target subbatch; determining a second quantity of the multiple nodes that have persistently stored a target batch to which the target subbatch belongs; and in response to the first quantity and the second quantity both meeting a consensus fault tolerance, determining that transactions in the target subbatch are confirmable transactions.

20 Claims, 10 Drawing Sheets

(56) References Cited

U.S. PATENT DOCUMENTS

| | | | | |
|---|---|---|---|---|
| 10,581,805 | B2 | 3/2020 | Simons et al. | |
| 10,708,060 | B2 | 7/2020 | Fang et al. | |
| 10,839,395 | B2 | 11/2020 | Simons | |
| 10,938,548 | B2 | 3/2021 | Mercuri et al. | |
| 10,938,567 | B2 | 3/2021 | Martino et al. | |
| 11,023,309 | B2 | 6/2021 | Deng | |
| 2019/0139043 | A1 | 5/2019 | Davis | |
| 2019/0235946 | A1* | 8/2019 | Guo | H04L 9/3239 |
| 2019/0238316 | A1 | 8/2019 | Padmanabhan | |
| 2019/0260574 | A1* | 8/2019 | Shi | H04L 9/3239 |
| 2019/0287105 | A1* | 9/2019 | Fedorov | H04L 9/08 |
| 2020/0160289 | A1 | 5/2020 | Mahajan et al. | |
| 2020/0162264 | A1 | 5/2020 | Zamani et al. | |
| 2020/0174463 | A1 | 6/2020 | Cella et al. | |
| 2020/0379852 | A1* | 12/2020 | Yang | G06F 9/4401 |
| 2020/0394159 | A1* | 12/2020 | Hurley | H04L 63/123 |
| 2020/0401577 | A1* | 12/2020 | Ohashi | H04L 9/3239 |
| 2021/0049601 | A1* | 2/2021 | Yang | G06Q 20/389 |
| 2021/0166126 | A1 | 6/2021 | Katz et al. | |

FOREIGN PATENT DOCUMENTS

| | | | |
|---|---|---|---|
| CN | 111047449 | A | 4/2020 |
| CN | 111147228 | A | 5/2020 |

OTHER PUBLICATIONS

Huang et al., "Optimal bitcoin transaction fee payment strategy based on queuing game," Journal of Computer Applications, Sep. 10, 2020.

Xu et al., "Designing blockchain-based applications a case study for imported product traceability," Future Generation Computer Systems, Oct. 16, 2018.

Extended European Search Report for European Patent Application No. 21 182 721.7 dated Dec. 22, 2021.

Rouhani et al., "Security, Performance, and Applications of Smart ontracts: A Systematic Survey," IEEE, vol. 7, Apr. 2019.

Ricci et al, "Learning Blockchain Delays: A Queueing Theory Approach," Performance Evaluation Review, vol. 46, No. 3, Dec. 2018.

* cited by examiner

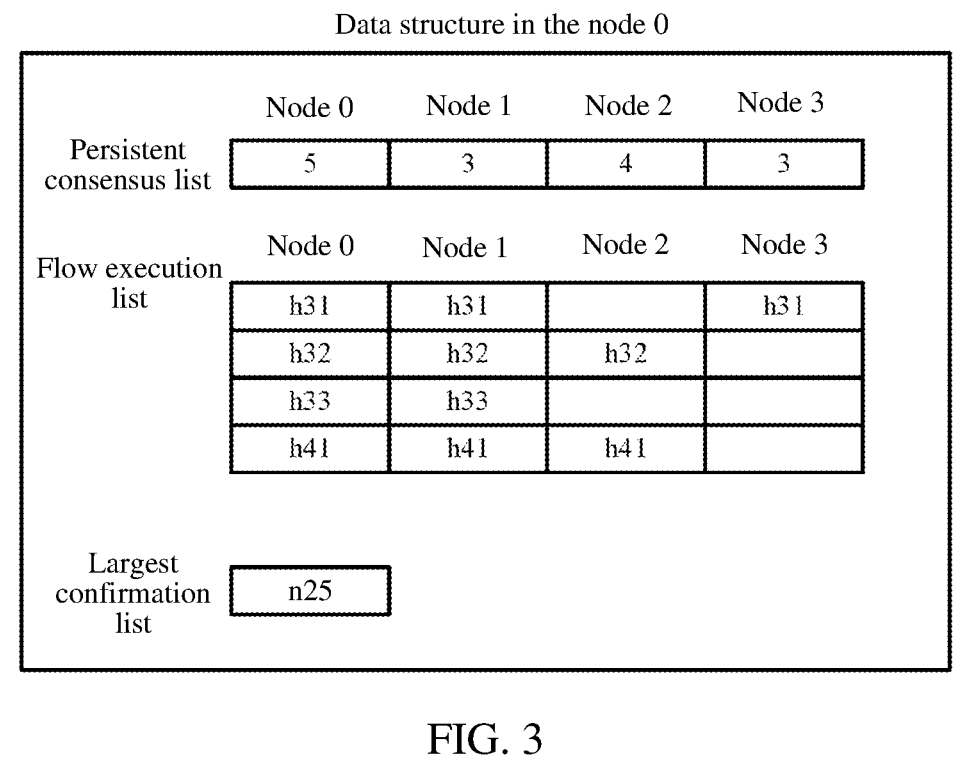

Data structure in the node 0

Persistent consensus list

| Node 0 | Node 1 | Node 2 | Node 3 |
|---|---|---|---|
| 5 | 3 | 4 | 3 |

Flow execution list

| Node 0 | Node 1 | Node 2 | Node 3 |
|---|---|---|---|
| h31 | h31 | | h31 |
| h32 | h32 | h32 | |
| h33 | h33 | | |
| h41 | h41 | h41 | |

Largest confirmation list

| n25 |
|---|

FIG. 3

TRANSACTION CONFIRMATION METHODS AND APPARATUSES IN BLOCKCHAIN NETWORK

CROSS REFERENCE TO RELATED APPLICATIONS

The present application is based on and claims priority to Chinese Patent Application No. 202010889845.6 filed on Aug. 28, 2020 and titled "TRANSACTION CONFIRMATION METHODS AND APPARATUSES IN BLOCKCHAIN NETWORK", the entire contents of which are incorporated herein by reference.

TECHNICAL FIELD

One or more embodiments of this specification relate to the field of blockchain technologies, and in particular, to transaction confirmation methods and apparatuses in a blockchain network.

BACKGROUND

A blockchain technology is a new application mode of using computer technologies such as point-to-point transmissions, consensus mechanisms, and encryption algorithms to implement distributed data storage. In a blockchain network, data can be stored and recorded through transactions. In early blockchain networks, only transfer transactions are supported. An increasing number of blockchain platforms support smart contracts to execute more varied transactions. In this way, the blockchain platforms allow users to execute transactions with more varied content to provide more varied functions.

SUMMARY

A transaction confirmation mechanism is described in one or more embodiments of this specification, to reduce a transaction confirmation delay, enhance user experience, ensure throughput of a platform, and improve performance of the platform.

Embodiments of the present disclosure provide a transaction confirmation method in a blockchain network. The method can be implemented by a first node in the blockchain network. The method can include: in response to detecting an event indicating that one of the multiple nodes has persistently stored a batch of transactions or executed transactions of a subbatch of transactions, determining, by the first node, a current latest subbatch of subbatches of transactions for which the multiple nodes have confirmed; determining, by the first node, a target subbatch according to the current latest subbatch; determining, by the first node, a first quantity of the multiple nodes that have generated execution results that are consistent with an execution result of the target subbatch in the first node; determining, by the first node, a second quantity of the multiple nodes that have persistently stored a target batch to which the target subbatch belongs; and in response to the first quantity and the second quantity both meeting a consensus fault tolerance, determining, by the first node, that transactions in the target subbatch are confirmable transactions.

In some embodiments, the first node includes a persistent consensus list, a flow execution list, and a largest confirmation list, the persistent consensus list records latest batch information of a persistently stored transaction batch in each of the multiple nodes, the flow execution list records, for each of the multiple nodes, an execution result a transaction subbatch in the transaction batch on which a consensus is reached, and the largest confirmation list records latest subbatch information confirmed in the first node.

In some embodiments, the method further comprises: in response to the first quantity and the second quantity both meeting the consensus fault tolerance, updating the current latest subbatch with the target subbatch.

In some embodiments, the first event comprises receiving a first message from another node in the multiple nodes, the first message includes latest transaction batch information for which the other node completes persistent storing, and the method further comprises: updating the persistent consensus list with the latest transaction batch information in the first message.

In some embodiments, the first event comprises receiving a second message from another node of the multiple nodes, wherein the second message includes an execution result of a newly added transaction subbatch by the other node, and the method further comprises: updating the flow execution list with the execution result of the newly added transaction subbatch in the second message.

In some embodiments, the persistent consensus list comprises a first entry corresponding to the first node, and the method further comprises: acquiring, from a volatile storage of the first node, a first batch on which a consensus is reached, wherein the first batch is a next transaction batch following a batch recorded in the first entry; initiate persistent storing on the first batch; and adding transactions in the first batch to an execution queue.

In some embodiments, the first event comprises updating records in the first entry with the first batch in response to the persistent storing of the first batch being completed.

In some embodiments, the method further comprises: broadcasting a third message to one or more other nodes of the multiple nodes in response to the first event being detected, wherein the third message includes information on the first batch for the one or more other nodes to update persistent consensus lists in the one or more other nodes.

In some embodiments, the flow execution list comprises a second entry corresponding to the first node, and the first event comprises adding a first execution result of a first subbatch in the first batch to the second entry when the first execution result is generated.

In some embodiments, the method further comprises: broadcasting a fourth message to one or more other nodes of the multiple nodes in response to the first event being detected, wherein the fourth message includes information on the first execution result for the one or more other nodes to update flow execution results in the one or more other nodes.

In some embodiments, the execution result of the transaction subbatch comprises a hash value of the execution result of the transaction subbatch.

In some embodiments, the latest batch information is the largest batch number, and the determining a second quantity of the multiple nodes that have persistently stored a target batch to which the target subbatch belongs comprises: based on the persistent consensus list, determining, as the second quantity, a quantity of nodes whose largest batch numbers are greater than or equal to a batch number of the target batch.

In some embodiments, in response to determining that transactions in the target subbatch are confirmable transactions, the method further comprises: for any first transaction in the target subbatch, determining whether the first transaction is a local transaction, wherein the local transaction is a transaction directly received by the first node from a user client; and in response to a determination that the first transaction is a local transaction: determining a first user client corresponding to the first transaction, and sending a first confirmation message to the first user client, wherein the first confirmation message is used to indicate that the first transaction has been accurately executed.

In some embodiments, the first confirmation message comprises a transaction identifier of the first transaction, execution results of all transactions in the target subbatch, and signatures of the nodes of the first quantity.

In some embodiments, a quantity of transactions in the transaction batch is less than a quantity of transactions included in one block, and the method further comprises: in response to all transactions in a plurality of transaction batches are determined as confirmable transactions, forming a block based on the plurality of transaction batches.

Embodiments of this specification further provide a system comprising one or more processors and one or more non-transitory computer-readable memories coupled to the one or more processors and configured with instructions executable by the one or more processors to cause the system to perform operations in a blockchain network implemented by a first node of multiple nodes in the blockchain network, the operations comprising: in response to detecting an event indicating that one of the multiple nodes has persistently stored a batch of transactions or executed transactions of a subbatch of transactions, determining, by the first node, a current latest subbatch of subbatches of transactions for which the multiple nodes have confirmed; determining, by the first node, a target subbatch according to the current latest subbatch; determining, by the first node, a first quantity of the multiple nodes that have generated execution results that are consistent with an execution result of the target subbatch in the first node; determining, by the first node, a second quantity of the multiple nodes that have persistently stored a target batch to which the target subbatch belongs; and in response to the first quantity and the second quantity both meeting a consensus fault tolerance, determining, by the first node, that transactions in the target subbatch are confirmable transactions.

Embodiments of this specification further provide one or more non-transitory computer-readable storage media storing instructions executable by one or more processors, wherein execution of the instructions causes the one or more processors to perform operations in a blockchain network implemented by a first node of multiple nodes in the blockchain network, the operations comprising: in response to detecting an event indicating that one of the multiple nodes has persistently stored a batch of transactions or executed transactions of a subbatch of transactions, determining, by the first node, a current latest subbatch of subbatches of transactions for which the multiple nodes have confirmed; determining, by the first node, a target subbatch according to the current latest subbatch; determining, by the first node, a first quantity of the multiple nodes that have generated execution results that are consistent with an execution result of the target subbatch in the first node; determining, by the first node, a second quantity of the multiple nodes that have persistently stored a target batch to which the target subbatch belongs; and in response to the first quantity and the second quantity both meeting a consensus fault tolerance, determining, by the first node, that transactions in the target subbatch are confirmable transactions.

For the method and apparatus provided in the embodiments of this specification, consensus is initiated in batches, and a flow execution result is summarized in subbatches with fewer transactions to confirm a transaction, thereby reducing a consensus wait time, an execution wait time, and a confirmation wait time of a transaction, to significantly reduce a transaction confirmation delay. In addition, in the foregoing solution, in a manner of separating persistence and transaction execution in parallel, persistence overheads are concealed, thereby reducing the impact of a small batch of consensus on the TPS of a platform and ensuring TPS performance of the platform.

BRIEF DESCRIPTION OF THE DRAWINGS

To describe the technical solutions in the embodiments of this specification or in the existing technologies more clearly, the following briefly describes the accompanying drawings required for describing the embodiments or the existing technologies. Apparently, the accompanying drawings in the following description show merely some of the embodiments of this specification, and a person of ordinary skill in the art may still derive other drawings from the accompanying drawings.

FIG. 3 is a schematic of an example data list maintained in a node 0, according to some embodiments of this specification.

FIG. **5*a*** is a schematic of an example trigger event as receiving a first message, according to some embodiments of this specification.

FIG. **5*b*** is a schematic of an example trigger event as receiving a second message, according to some embodiments of this specification.

FIG. **5*c*** is a schematic of an example trigger event as updating a persistence status, according to some embodiments of this specification.

FIG. **5*d*** is a schematic of an example trigger event as updating a flow execution status, according to some embodiments of this specification.

Figure 6:
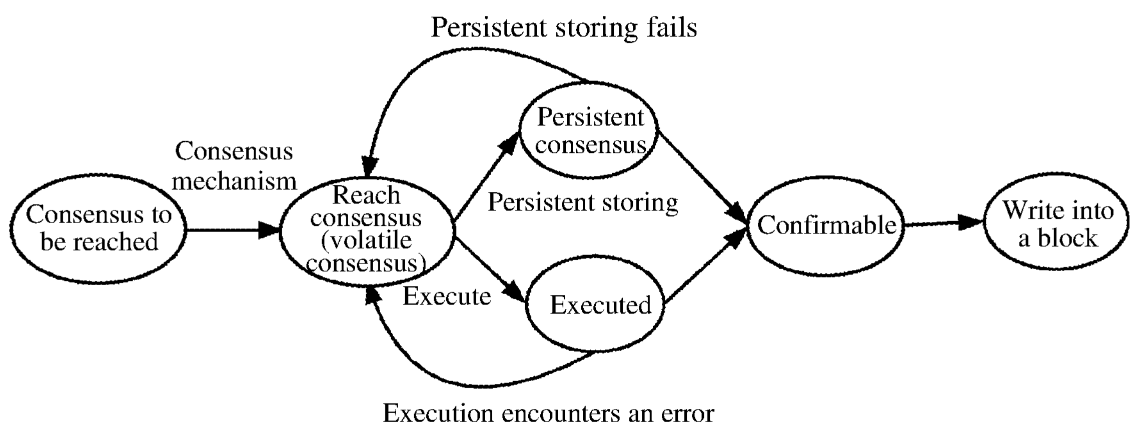

FIG. 6 is a schematic of an example transaction status conversion, according to some embodiments of this specification.

Figure 7:
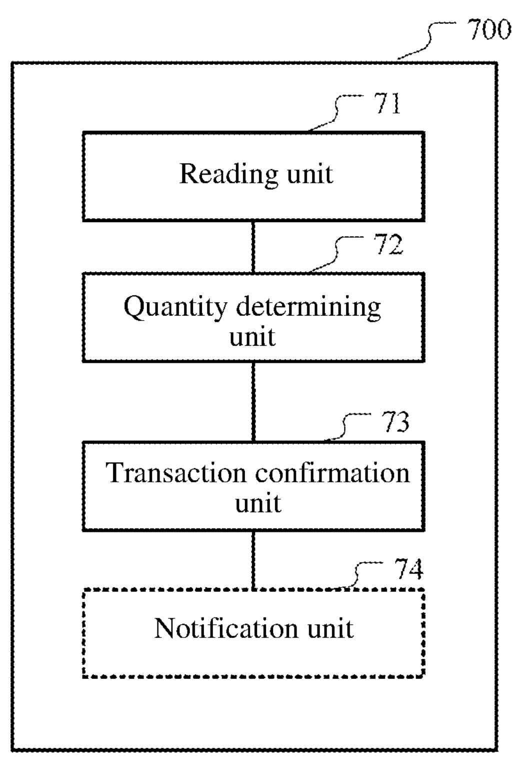

FIG. 7 is a schematic of an example transaction confirmation apparatus in a node, according to some embodiments of this specification.

DETAILED DESCRIPTION OF THE INVENTION

The solutions provided in this specification are described below with reference to the accompanying drawings.

A blockchain network may be formed by a plurality of nodes. These nodes can generate a new block by using a consensus mechanism in order to perform a transaction in the block. At least a portion of these nodes may be used as servers or blockchain platforms to interact with users. A user can send a transaction using such a platform node. The platform node can broadcast the transaction of the user in the blockchain network, for the nodes in the blockchain network to reach a consensus on the transaction and accurately execute the transaction. After the transaction is accurately executed, the platform node can return, to the user, an execution result of the transaction by the blockchain network. This is referred to as transaction confirmation. The time taken for the user to send the transaction and the platform node to return the execution result of the transaction by a blockchain system to the user is referred to as a transaction confirmation delay.

The transaction confirmation delay is closely related to the user experience. If the user fails to receive transaction confirmation information in time after sending the transaction, the user's experience of using the blockchain platform may be significantly reduced. However, reduction of the transaction confirmation delay can conflict with high throughput (e.g., transactions per second (TPS)) of the blockchain platform, and it is difficult to ensure performance in both aspects.

Therefore, it is desirable to provide an effective solution that can reduce a transaction confirmation delay without impairing throughput of the blockchain platform, thereby enhancing user experience and improving performance of a blockchain platform.

Figure 1:
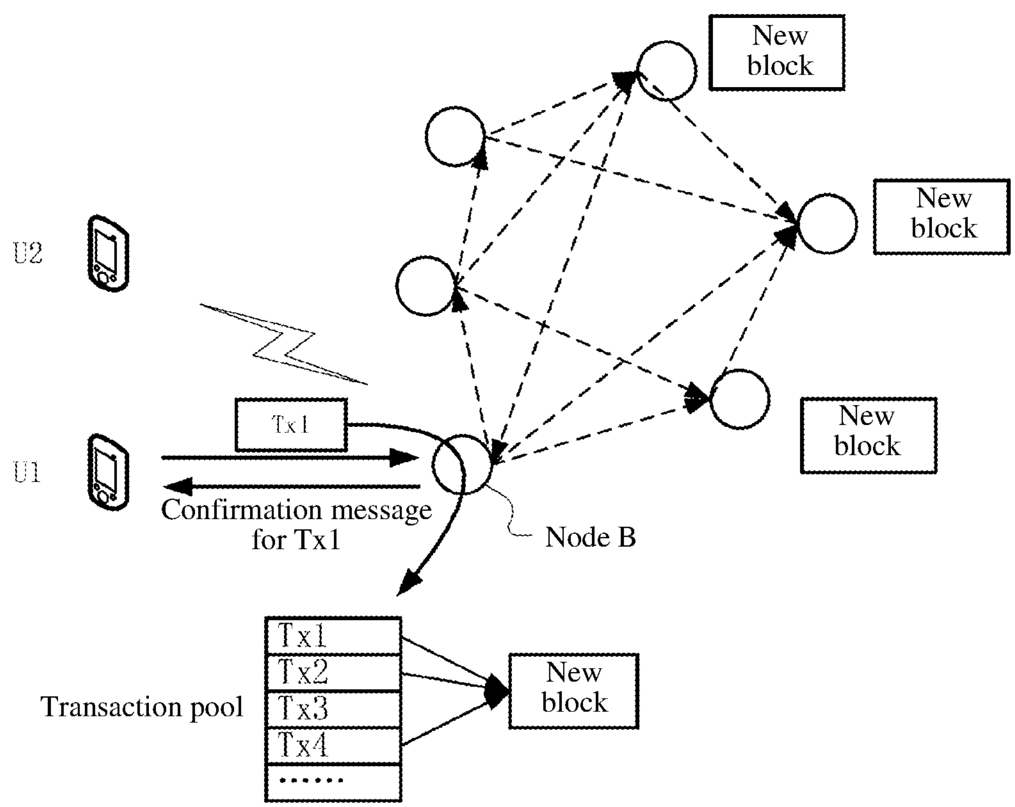
FIG. 1 is a schematic of an example process of transaction sending to transaction confirmation.

FIG. 1 is a schematic of an example process of transaction sending to transaction confirmation. As shown in FIG. 1, a blockchain network includes a plurality of nodes. The nodes may communicate with each other. Some nodes may be used as platforms that are connected to a plurality of user terminals, such as user terminals U1 and U2. As a result, the user terminals may be connected to the blockchain network through platform nodes.

As shown in FIG. 1, a node B in the network is used as a platform node that is connected to user terminals. FIG. 1 exemplarily shows user terminals U1 and U2. A user is connected to the platform node B through the user terminal U1, and the user can send a transaction Tx1 through the user terminal U1. In some embodiments, the transaction Tx1 may be an ordinary transfer transaction, a transaction of creating a smart contract, or a transaction of invoking a smart contract.

In some embodiments, each node can maintain a transaction pool locally, place a received transaction in the transaction pool, and broadcast the received transaction to other nodes. As shown in FIG. 1, the node B can place both a transaction received by the user terminal (for example, the foregoing Tx1) and a broadcast transaction received from another node in the transaction pool. When there are sufficient transactions in the transaction pool, the node B retrieves some transactions from the transaction pool, and pack the transactions into a block. The block includes, for example, the foregoing transaction Tx1. Next, the node B may broadcast, in the blockchain network, the transactions packed by the node B in order to reach a consensus. In addition, other nodes in the blockchain network may also broadcast transactions packed by the other nodes in order to initiate consensus. Theoretically, by using a peer-to-peer (P2P) propagation mechanism of the blockchain network, each transaction may be propagated to each node. However, for reasons such as transmission delays in the network, transactions in transaction pools of different nodes are different. Therefore, transaction blocks packed by the nodes can also be different. Finally, by using a consensus mechanism set in the blockchain network, the nodes reach a consensus on a transaction block that needs to be executed subsequently. In an implementation, a master node may be configured. The master node can assist in a consensus being reached. Other nodes may acquire, from the master node, a list of transactions that need to be executed subsequently, and use the list of transactions as a consensus result.

Each node may perform local persistent storing of a transaction block on which consensus is reached, and transactions in the transaction block on which consensus is reached may be sequentially performed in order to keep consistent data content recorded in nodes of the entire network. For the foregoing transaction Tx1 shown in FIG. 1, the node B needs to reach consensus on a transaction block including Tx1, store the transaction block, and execute the transaction block before the node B can return a confirmation message related to an execution result of the transaction Tx1 to the user terminal U1.

As can be seen from the foregoing process, factors that affect a transaction confirmation delay can include a consensus wait time, a network delay in consensus, a persistence delay in consensus, a delay of waiting for a transaction to be executed, a transaction execution delay, and a delay of waiting for a transaction to be confirmed.

In another aspect, factors that affect a transaction throughput (e.g., TPS) of the platform can include a consensus time, a transaction execution time, and a transaction result persistence time. Generally, when an average consensus time and an average persistence time of a unit transaction are shorter, the TPS of the platform is larger. It is appreciated that the persistence time may not be significantly affected by the size of content being made persistent, but may be closely related to a number of times in performing persistent storing. For example, when information of 10 k and 100 k are persistently stored, and a time required for storing the information of 10 k and a time required for storing the information of 100 k may be quite close. However, if each time information of 10 k is persistently stored and the recording is performed ten times, a total time is much longer than a time of persistently storing information of 100 k once. Therefore, users and systems usually increase a quantity of consensus transactions in one batch to reduce time costs for consensus and persistent storing of each transaction, thereby increasing the TPS. For example, in some solutions, consensus is reached in blocks. According to the settings of different blockchain systems, one block usually includes hundreds of transactions (for example, 300 transactions). In this way, the hundreds of transactions share time costs for consensus and persistent storing together.

However, if the quantity of consensus transactions in one batch is relatively large, delays of waiting for a transaction to be executed and waiting for the transaction to be confirmed are increased, resulting in an increase in a total delay for confirming the transaction. For example, if a transaction is located near the top in a consensus block (for example, near the first few transactions of 300 transactions in the consensus block), the transaction can be confirmed only after the 300 transactions in this block have been executed. For a transaction near the end in a consensus block, because transactions need to be sequentially executed, this transaction usually can be executed only after all transactions in front of the transaction have been executed, and a delay of waiting for the transaction to be executed is relatively long.

Therefore, conventionally, an increase in throughput (e.g., in TPS) conflicts with reduction of a transaction confirmation delay, and it is very difficult for the platform to ensure performance in both aspects.

In consideration of the foregoing issues, embodiments of this specification provide improved solutions. The solutions may reduce transaction confirmation delay while minimizing the impact on the TPS. To reduce a consensus wait time of a transaction, ways of improving the frequency of consensus, reducing a consensus interval, and reducing the quantity of consensus transactions in one batch may be adopted to improve delay performance. An increase in the frequency of consensus can cause an increase in persistence overheads in a consensus process. To prevent a synchronous wait for persistent storing during consensus of a small batch from impairing the throughput of the system, embodiments of this specification provide ways for implementing persistent storing and transaction execution in parallel in order to conceal persistence overheads. To further reduce the delay waiting for a transaction to be executed and the delay of waiting for a transaction to be confirmed in one consensus batch, embodiments of this specification further provide a flow confirmation process. That is, in one consensus batch, a transaction execution result may be summarized in subbatches of smaller quantities of transactions. When transaction execution of a subbatch meets a preset condition, a transaction in the subbatch may be confirmed, thereby further reducing the transaction confirmation delay.

Figure 2:
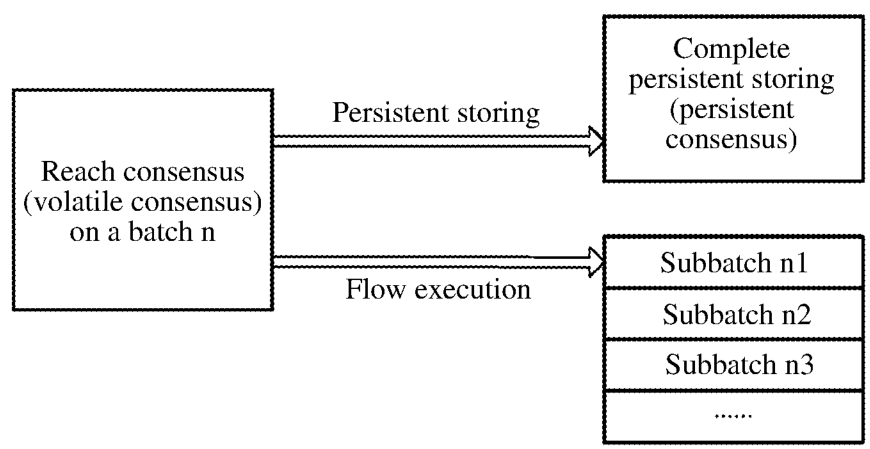
FIG. 2 is a schematic of an example transaction processing process, according to some embodiments of this specification.

FIG. 2 is a schematic of an example transaction processing process, according to some embodiments of this specification. As discussed above, consensus can be initiated in small batches by ways of increasing the frequency and reducing time intervals. For example, the consensus time interval may be reduced from conventional 500 ms to approximately 50 ms. In addition, a number of transactions in each consensus batch can also be reduced. For example, one consensus batch can include 40 transactions instead of 400 transactions. Such a quantity is far less than a quantity (for example, hundreds of transactions) of transactions in one block. It is appreciated that specific values of the interval time and the transaction quantity in the foregoing are only examples. Settings and changes may be made as required within the concept of this specification.

In some embodiments, a consensus process of each transaction batch may be classified as a volatile consensus and a persistent consensus. When nodes reach, according to a consensus protocol, an agreement on transactions to be executed and an execution order of the transactions, the nodes may acquire a list of transactions on which the agreement is reached. In some embodiments, the list of transactions may be received from another node or may be determined locally according to a consensus algorithm. In this case, the list of transactions may be recorded in volatile storages (e.g., random-access memory, and cache) of the nodes, and such a state may be referred to as volatile consensus. Subsequently, the nodes make persistent or persistently store the transactions in the list that are in the volatile consensus state. After all the nodes have made persistent the transactions in the list, this batch of transactions may enter a persistent consensus state.

For ease of description below, the volatile consensus state is referred to as reaching consensus, consensus is reached, or variations thereof. When consensus is reached on a transaction batch, it means that consensus has been reached on the transaction batch but the persistent storing of the transaction batch is not completed.

In some embodiments, to conceal persistence overheads, once consensus is reached on a batch of transactions (e.g., a batch n of transactions in FIG. 2), that is, when the volatile consensus state is reached, while the transactions start to be persistently stored, the transactions are added to a to-be-executed transaction queue, transactions start to be executed in parallel, and execution results of subbatches are recorded in a flow. A subbatch may include a smaller quantity of transactions than a consensus batch. In this way, one transaction batch may include a plurality of subbatches. For example, the batch n in FIG. 2 includes a subbatch n1, a subbatch n2, etc. In a specific example, it is assumed that one consensus batch includes 40 transactions, and one subbatch may include 8 or 10 transactions.

In some embodiments, since the persistent storing and the flow execution are in parallel, to implement the foregoing concept of small batch of consensus and flow confirmation, data structures maintained by nodes may need to be updated. FIG. 3 is a schematic of an example data structure maintained in a blockchain node, according to some embodiments of this specification. As shown in FIG. 3, it is assumed that the blockchain network includes four nodes: nodes 0, 1, 2, and 3. FIG. 3 shows a data list maintained in the node 0. It is appreciated that other nodes in the blockchain network may maintain similar data lists with a similar structure. As shown in FIG. 3, a data structure maintained by the node 0 includes a persistent consensus list, a flow execution list, and a largest confirmation list. It is appreciated that the data structure shown in FIG. 3 can be used in the transaction processing process shown in FIG. 2.

As shown in FIG. 3, the persistent consensus list in node 0 is used to record, for each node (e.g., the nodes 0-3), largest batch information of a transaction batch that completes persistent storing on which consensus is reached, that is, largest transaction batch information of a persistently stored transaction of each node. In some embodiments, the largest batch information may be a batch number of a persistently stored largest batch or may be the largest transaction number in the largest batch. In some embodiments, the largest batch can refer to a batch with a largest batch number. In some embodiments, the batch numbers are assigned to batches according to a sequence of execution on the batches. For example, bigger batch numbers are assigned to batches that are executed later. In some embodiments, the largest batch information may directly correspond to a persistently stored batch that is to be executed latest, and information such as batch numbers or transaction numbers may not be necessary in determining the largest batch information.

As discussed above, for the transaction batch on which a consensus is reached, the nodes separately persistently store the transaction batch. For example, for one node i, once the persistent storing of one transaction batch is completed, the node i records, in an entry corresponding to the current node i in the persistent consensus list, the latest transaction batch for which persistent storing has been currently completed. In addition, the latest largest transaction batch information is further broadcast to other nodes. In some embodiments, the node i also receives largest transaction batch information broadcast and reported by another node, thereby continuously updating the persistent consensus list in the node i.

As shown in FIG. 3, a batch number is used as an example. As shown in FIG. 3, for a transaction batch on which a consensus is reached, the largest transaction batch for which the node 0 currently has completed persistent storing is a batch 5, the largest transaction batch that is reported by the node 1 and for which persistent storing has been completed is a batch 3, the largest batch reported by the node 2 is a batch 4, and the largest batch reported by the node 3 is a batch 3.

It is appreciated that that, the foregoing is a current state of the persistent consensus list recorded in the node 0. Due to other factors such as network delays, data content in a persistent consensus list recorded in another node and that in the node 0 may be different, but may have similar principles and structures.

As shown in FIG. 3, the flow execution list is used to record, for each node, an execution result of a transaction subbatch in the transaction batch on which consensus is reached. In some embodiments, the flow execution list in each node can keep track of the execution results in the current node and other nodes. For example, as shown in FIG. 3, the flow execution list in node 0 includes execution results from nodes 0-3. As discussed above, for the transaction batch on which consensus is reached, the nodes can separately sequentially execute transactions in the transaction batch, and record execution results of subbatches. For example, for one node i, when the node i executes transactions in one subbatch, an execution result of the subbatch is added to an entry corresponding to the current node i in the flow execution list. In addition, the node i further broadcasts the execution result of the subbatch to other nodes. In some embodiments, the node i also receives, from another node, execution results, broadcast and reported by the other node, of transaction subbatches by the other node, thereby continuously updating the flow execution list in the node i.

In some embodiments, the foregoing execution result of the transaction subbatch may be a variable value after the transactions are executed or may be a hash value obtained after hash operation is performed on the execution result.

As shown in FIG. 3, as an example, a hash value is used as an execution result of a transaction. As shown in FIG. 3, the node 0 has generated execution results h31, h32, and h33 for subbatches n31, n32, and n33 in the consensus batch 3 and has generated an execution result h41 for a first subbatch n41 in the batch 4. The execution of the node 1 is the same as that of the node 0. Execution results of transactions reported by the node 2 include an execution result h32 of the second subbatch n32 in the batch 3 and an execution result h41 of the first subbatch n41 in the batch 4. An execution result of transactions reported by the node 3 includes an execution result h31 of a first subbatch n31 in the batch 3.

The foregoing is a current state of the flow execution list recorded in the node 0. Due to other factors such as network delays, data content in a flow execution list recorded in another node and that in the node 0 may be different, but may have similar principles and structures.

As shown in FIG. 3, a largest confirmation list is further maintained in each node. The largest confirmation list is used to record largest subbatch information confirmed in a current node. For example, in FIG. 3, the largest subbatch currently confirmed by the node 0 is n25, that is, the fifth subbatch in the second batch.

Figure 4:
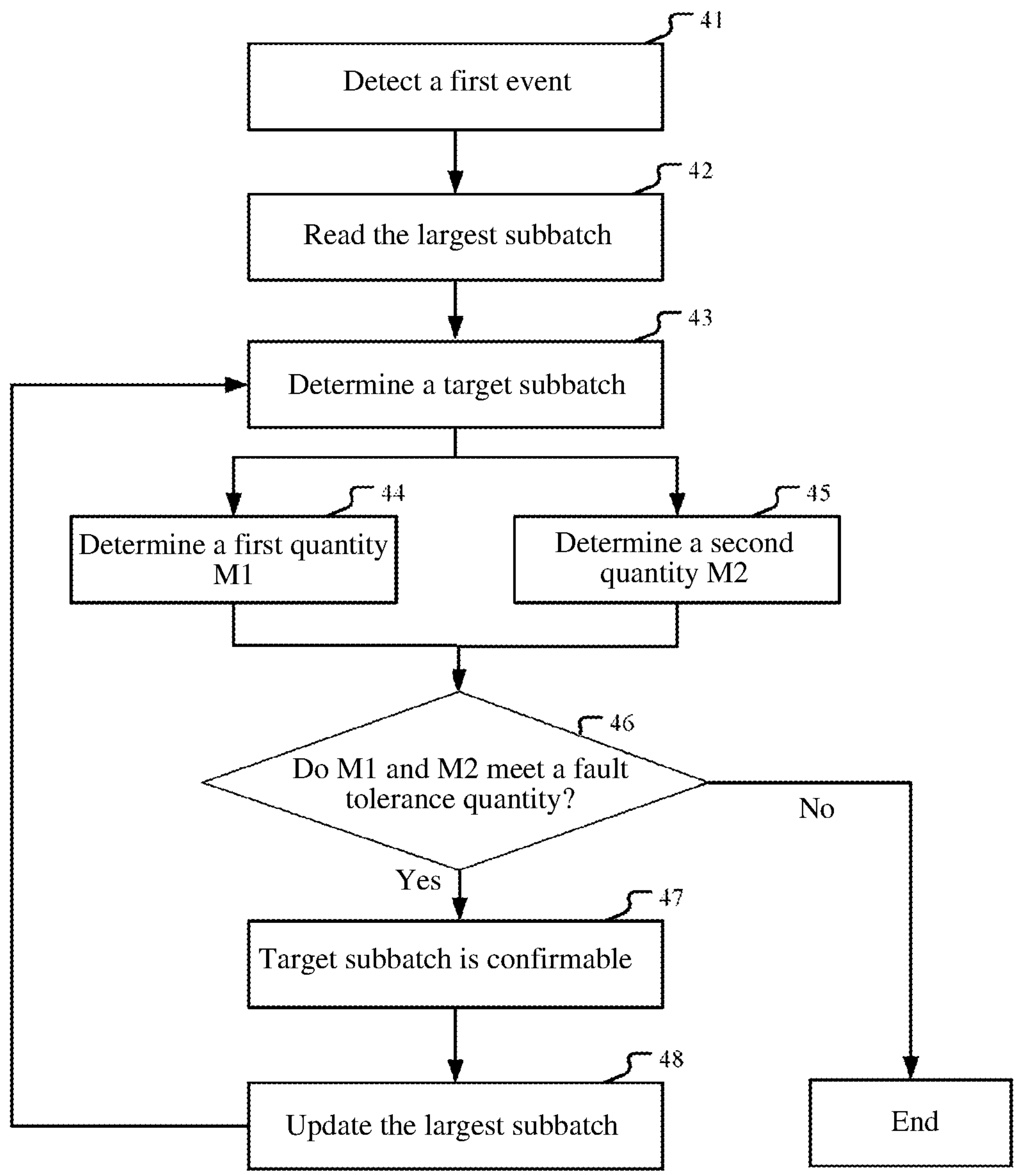
FIG. 4 is a flowchart of an example transaction confirmation, according to some embodiments of this specification.

Based on the transaction processing process shown in FIG. 2 and the data structure shown in FIG. 3, the nodes may confirm, with shorter delays, transactions that are accurately executed in order to implement reduction of a transaction confirmation delay. FIG. 4 is a flowchart of an example transaction confirmation, according to some embodiments of this specification. The procedure may be performed by any node (e.g., node 0 shown in FIG. 3). For ease of description, the node is referred to as a first node. The node 0 is still used as an example of the first node for description below. It is appreciated that the node 0 can maintain the data structure shown in FIG. 3. The data structure includes the persistent consensus list, the flow execution list, and the largest confirmation list, similar to those shown in FIG. 3.

As shown in FIG. 4, in step 41, a trigger event is detected. In some embodiments, the first node continuously monitors the persistent consensus list and the flow execution list in order to capture the trigger event that causes the persistent consensus list or the flow execution list to change. In some embodiments, the trigger event indicates that one of the multiple nodes has persistently stored a batch of transactions or executed transactions of a subbatch of transactions.

In some embodiments, the trigger event includes receiving a first message from another node, where the first message indicates updated largest transaction batch information for which the other node completes persistent storing. In response to receiving the first message, the first node needs to update the persistent consensus list. As a result, the first node's largest batch information corresponding to the other node is updated to the largest transaction batch information in the first message.

Figure 5A:
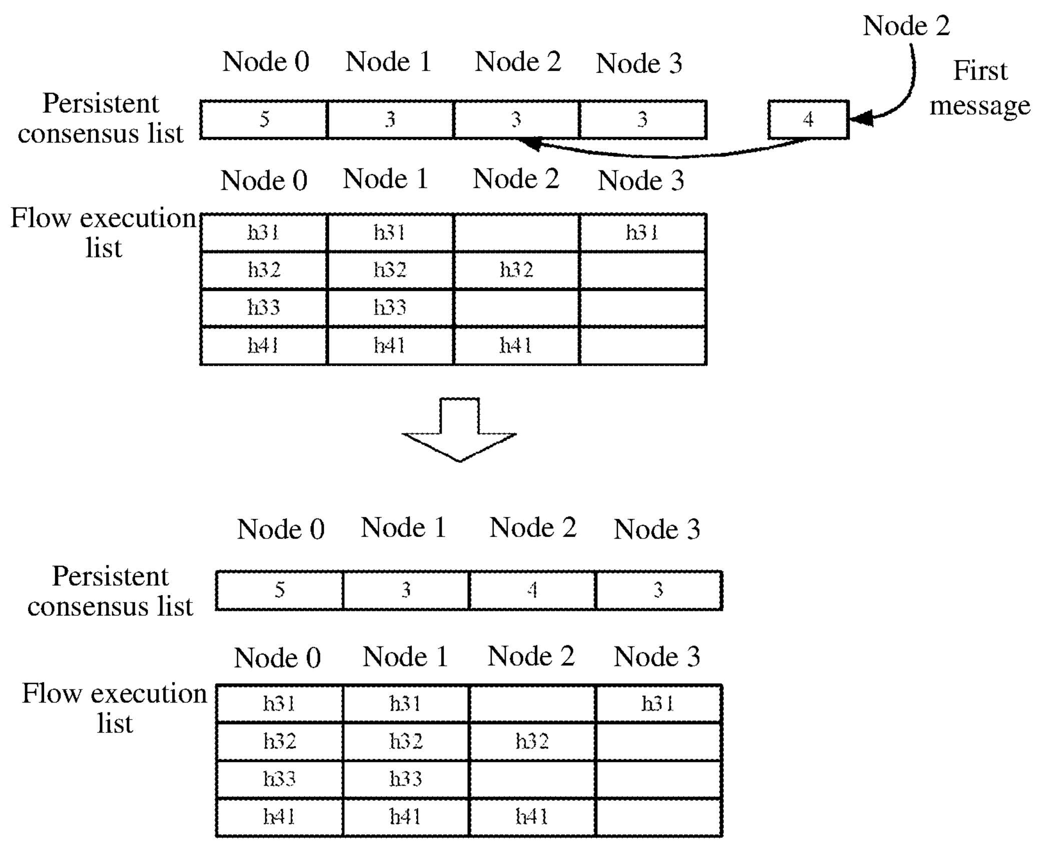

FIG. 5*a* is a schematic of an example trigger event as receiving a first message, according to some embodiments of this specification. As shown in FIG. 5*a*, the persistent consensus list and the flow execution list maintained by the node 0 at a moment t1 are shown on the upper side. In the persistent consensus list, the largest batch for which the node 2 has completed persistent storing is a batch 3. Next, the node 0 receives the first message of the node 2. The first message indicates that the node 2 has completed the persistent storing of a batch 4. As a result, node 2's largest transaction batch being persistently stored should be updated to the batch 4. In response to the first message, the node 0 updates its persistent consensus list, and the largest batch of the node 2 in the persistent consensus list is updated to the batch 4. The updated persistent consensus list is shown on the lower side of FIG. 5*a*.

In some embodiments, the trigger event includes receiving a second message from another node, where the second message indicates an execution result of a newly added transaction subbatch by the other node. In response to receiving the second message, the first node needs to update the flow execution list, and the execution result of the newly added transaction subbatch by the other node is added to the flow execution list.

Figure 5B:
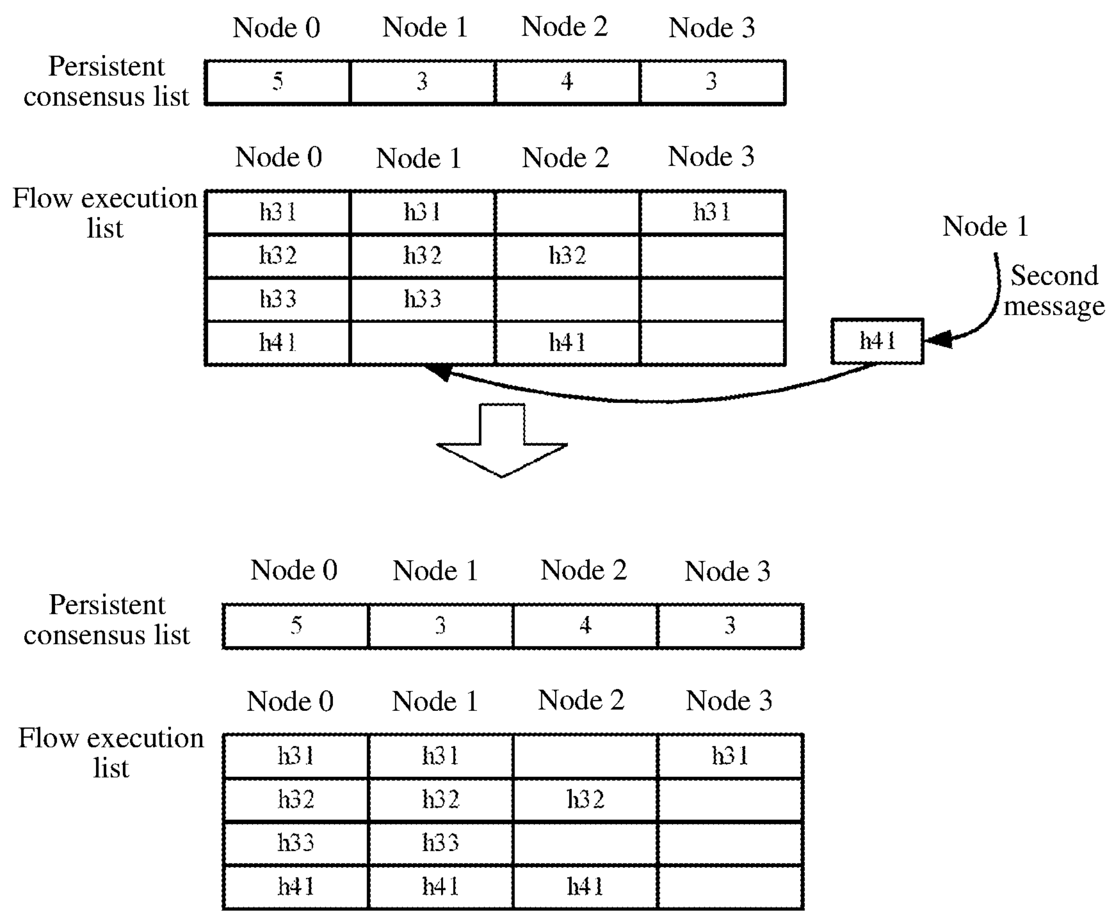

FIG. 5*b* is a schematic of an example trigger event as receiving a second message, according to some embodiments of this specification. As shown in FIG. 5*b*, a persistent consensus list and a flow execution list maintained by the node 0 at a moment t2 are shown on the upper side. As a trigger event, the node 0 receives the second message from the node 1. The second message indicates that the node 1 newly generated an execution result h41 of the first subbatch of the transactions in the batch 4. In response to receiving the second message, the node 0 updates its flow execution list, and the newly added execution result h41 is added to the entry of the node 1 in the flow execution list. The updated flow execution list is shown on the lower side of FIG. 5*b*.

In some embodiments, the trigger event may be an update of a persistence status or a flow execution status of the first node by the first node. For example, it may be assumed that the first node currently has completed the persistent storing of an n-th batch. It is appreciated that the (volatile) consensus and persistence of the transaction may be performed in different threads in parallel. Therefore, it may be assumed that in this case, volatile consensus is reached on a plurality of subsequent batches. In this case, the first node may acquire, from a volatile storage, a next batch on which consensus is reached. For example, the next batch can be an (n+1)-th batch. Then, the first node can initiate persistent storing of the next batch. In addition, the first node can add transactions in the (n+1)-th batch to a to-be-executed transaction queue to sequentially execute the transactions and generate subbatch execution results.

Once the persistent storing of the foregoing (n+1)-th batch is completed, the first node updates largest batch information corresponding to the current node in the persistent consensus list with the (n+1)-th batch. Such an update also forms the trigger event. In addition, the first node further broadcasts the information of the (n+1)-th batch to one or more other nodes in a message form. The message broadcast by the first node can also be referred to as a third message. The third message allows the other nodes to update, according to the third message, persistent consensus lists maintained by the other nodes.

Figure 5C:
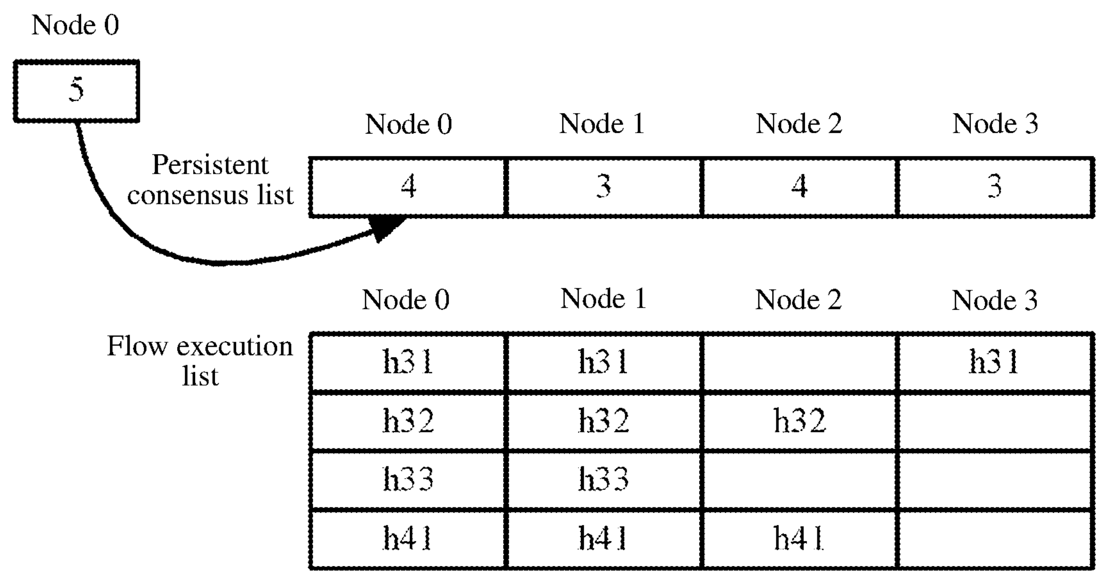
Figure 5C:
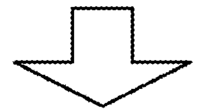
Figure 5C:
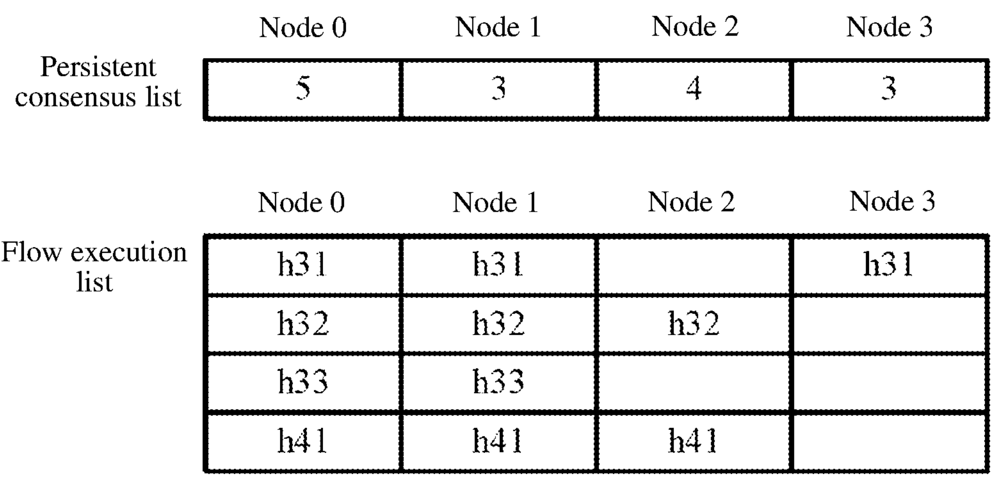

FIG. 5*c* is a schematic of an example trigger event as updating a persistence status, according to some embodiments of this specification. As shown in FIG. 5*c*, a persistent consensus list and a flow execution list maintained by the node 0 at a moment t3 are shown on the upper side. The largest batch persistently stored by the node 0 is a batch 4, which is shown in the entry corresponding to node 0 of the persistent consensus list. Subsequently, the node 0 has further completed the persistent storing of a batch 5. In this case, the largest batch information of the current node in the persistent consensus list is updated with the batch 5. The updated persistent consensus list is shown on the lower side of FIG. 5*c*.

In some embodiments, in a process in which the first node executes a transaction on which a consensus is reached, every time a new subbatch execution result is generated, the newly generated subbatch execution result is added to the flow execution list and the entry corresponding to the first node in order to update the flow execution list. Such an update can also form the trigger event. In addition, the first node further broadcasts the newly generated subbatch execution result to other nodes in a message form. The message broadcast by the first node can be referred to as a fourth message. The fourth message can allow the other nodes to update, according to the fourth message, flow execution lists maintained by the other nodes.

Figure 5D:
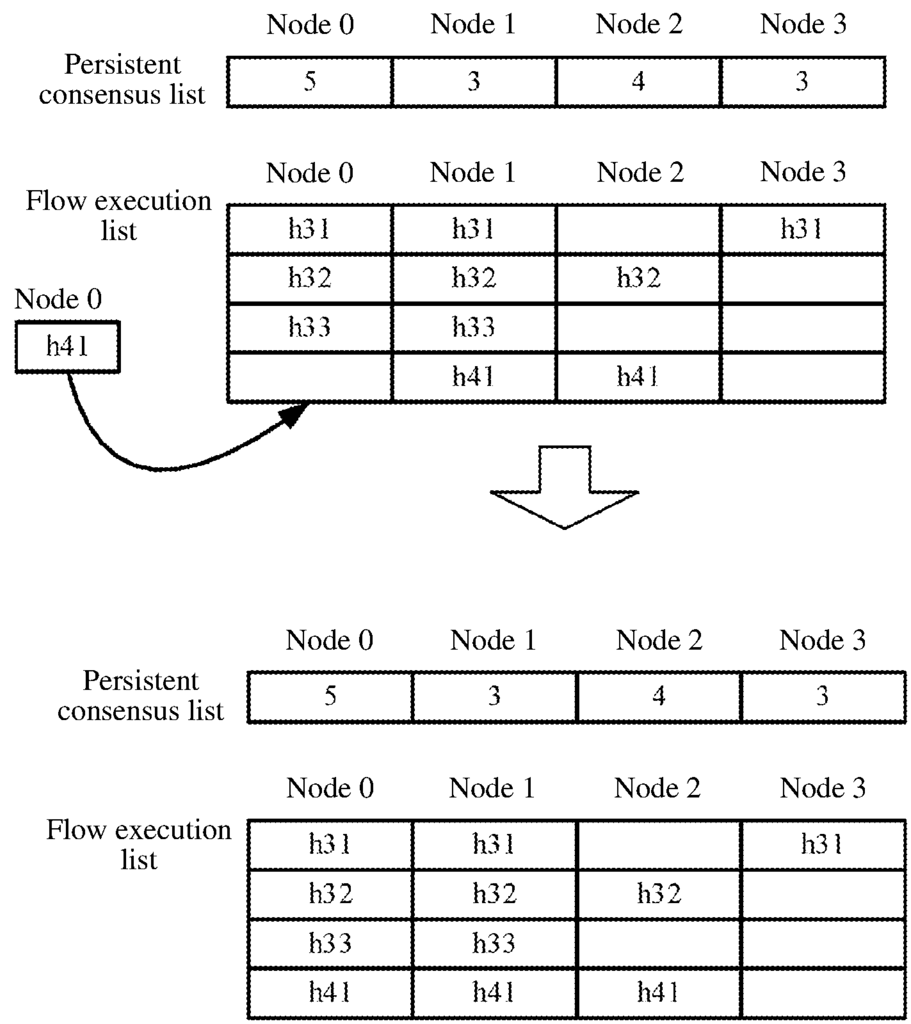

FIG. 5*d* is a schematic of an example trigger event as updating a flow execution status, according to some embodiments of this specification. As shown in FIG. 5*d*, a persistent consensus list and a flow execution list maintained by the node 0 at a moment t4 are shown on the upper side. Subsequently, the node 0 further generates an execution result h41 of the first subbatch in the batch 4. In this case, the newly generated execution result h41 is added to the entry corresponding to the current node in the flow execution list. The updated flow execution list is shown on the lower side of FIG. 5*d*.

Returning to FIG. 4, once the trigger event is detected, in step 42, a current largest subbatch is read from the largest confirmation list. In step 43, a target subbatch is determined. Initially, a next subbatch of the current largest subbatch is used as the target subbatch.

For the target subbatch, in step 44, a first quantity M1 of nodes that generated execution results for the target subbatch that are consistent with the first node is determined based on the flow execution list. The first quantity M1 means that at least M1 nodes have generated and reported execution results for the target subbatch, and the execution results for the target subbatch by the M1 nodes are the same as the first node and the same as each other.

In addition, in step 45, a second quantity M2 of nodes that completed persistent storing for a target batch to which the target subbatch belongs is determined based on the persistent consensus list. In other words, M2 nodes have completed the persistent storing of the batch to which the target subbatch belongs. For example, when records are kept in batch numbers in the persistent consensus list, in step 45, a quantity of nodes whose largest batch numbers are greater than or equal to a batch number of the target batch may be determined for use as the second quantity M2.

It is appreciated that steps 44 and 45 may be performed in any appropriate order, or may be performed in parallel. FIG. 4 exemplarily shows a case of parallel execution.

Next, in step 46, it is determined whether the first quantity and the second quantity both meet a consensus fault tolerance corresponding to N nodes. The consensus fault tolerance may be related to the consensus protocol used by the N nodes. For example, when a Byzantine Fault Tolerance (BFT) consensus protocol is used, provided that it is ensured that $N \geq 3m+1$, the accurate consistency of consensus can be ensured, where N is a total quantity of nodes, and m is a quantity of nodes that encounter one or more errors. The consensus fault tolerance can include consensus fault tolerance quantity that correspond to the N nodes in the BFT protocol may be obtained according to the foregoing formula and the quantity N of nodes. For example, when N is equal to 4, the consensus fault tolerance quantity is 3. That is, when three nodes in the four nodes generate consistent results, the accuracy of the results can be ensured. In a case of using another consensus protocol, the consensus fault tolerance quantity corresponding to the N nodes may be correspondingly determined. It is appreciated that the fault tolerance quantity can include different quantities for the first quantity and the second quantity.

If the first quantity and the second quantity both meet the consensus fault tolerance quantity, in step 47, transactions in the target subbatch are determined as confirmable transactions. In step 48, the current largest subbatch in the largest confirmation list is updated with the target subbatch. Subsequent subbatches can be sequentially used as the target subbatch, and the first quantity and the second quantity can be determined again.

Description is provided below with reference to a specific example. It is assumed that after the trigger event occurs, the persistent consensus list, the flow execution list, and the largest confirmation list in the node 0 are in a state that is similar to the data list shown in FIG. 3. In addition, it is assumed that the node 0 to the node 3 use the BFT consensus protocol, and the consensus fault tolerance quantity is 3.

In the example, in step 42, the read current largest subbatch is n25. In step 43, the next subbatch, that is, a first subbatch n31 in the third batch, is used as the target subbatch. In step 44, as shown in the flow execution list of FIG. 3, the three nodes all have generated consistent execution results h31 for the subbatch n31. Therefore, the first quantity is M1 being equal to 3.

In step 45, as shown in the persistent consensus list of FIG. 3, all the four nodes have completed the persistent storing of the third batch. Therefore, M2 is equal to 4.

Therefore, it may be obtained in step 46 that the first quantity M1 and the second quantity M2 both reach the consensus fault tolerance quantity. In this case, in step 47, transactions in the subbatch n31 are determined as confirmable transactions, and the current largest confirmed subbatch is updated to n31.

Next, a next subbatch n32 is used as the target subbatch. Similarly, in step 44, as shown in the flow execution list of FIG. 3, the three nodes all have generated consistent execution results h32 for the subbatch n32. Therefore, the first quantity is M1 being equal to 3. In step 45, as shown in the persistent consensus list of FIG. 3, all the four nodes have completed the persistent storing of the third batch. Therefore, M2 is equal to 4. Correspondingly, after the determining in step 46, in step 47, transactions in the subbatch n32 are determined as confirmable transactions, and the current largest confirmed subbatch is updated to n32.

When a next subbatch n33 is used as the target subbatch, it may be obtained in step 44 that only two nodes have generated consistent execution results h33 for n33. Therefore, M1 is equal to 2. In this case, the consensus fault tolerance quantity is not met, and transactions in n33 may not be confirmed.

If n41 is used as the target subbatch, the corresponding first quantity is M1 being equal to 3, but only the node 0 and the node 2 have completed the persistent storing of the fourth batch. Therefore, the second quantity is M2 being equal to 2, and the consensus fault tolerance quantity is not met. Therefore, the subbatch n41 cannot be confirmed.

In the process shown in FIG. 4, the first node may determine confirmable transaction subbatches. Next, a confirmation message can be sent to a corresponding user terminal to implement transaction confirmation for a user. However, transactions in the confirmable transaction subbatches may come from a plurality of platform nodes. For this purpose, in some embodiments, the nodes are set to return confirmation messages to user terminals that send transactions by using this platform.

In some embodiments, for the first node, any transaction in the confirmable transaction subbatch is referred to as a first transaction. The first node determines whether the first transaction is a local transaction. The local transaction is a transaction directly received by the first node from a user client. If the first transaction is a local transaction, the first node determines a first user client corresponding to the first transaction, and sends a confirmation message to the first user client. The confirmation message can be used to indicate that the first transaction has been accurately executed. It is appreciated that a user client can refer to a client terminal used by a user, or a user itself.

In some embodiments, the foregoing execution results of a subbatch that are reported by the nodes in a flow include transaction identifiers of transactions in the subbatch, transaction execution results, or signatures of nodes. Confirmation messages for the transactions may be generated based on the execution results of the subbatch. For example, a transaction identifier of the first transaction may be acquired from execution results of a subbatch including the first transaction that are reported by the nodes. Execution results and node signatures of all the transactions in the subbatch are included in a confirmation message for the first transaction. In this way, a client may verify the confirmation message based on the execution result and the node signature of the foregoing subbatch. In some embodiments, the confirmation message may optionally include information such as a batch number of a batch to which the first transaction belongs.

In some embodiments, when transactions in one subbatch are confirmed, the subbatch may enter a to-be-written state. As discussed above, a quantity of transactions in a consensus batch is usually less than a quantity of transactions included in one block, and a quantity of transactions in a subbatch is smaller. Therefore, when all transactions in a plurality of transaction batches are determined as confirmable transactions, the plurality of confirmed transaction batches may be written into a block.

FIG. 6 is a schematic of an example transaction status conversion, according to some embodiments of this specification. In FIG. 6, changes in a processing status are shown from the perspective of a transaction. As shown in FIG. 6, after the node receives a transaction Tx sent by a user, the transaction is initially in a state for consensus to be reached. Next, through a consensus mechanism between the nodes, consensus is reached on the transaction to enter a to-be-processed state. After consensus is reached, the transaction may be separately made persistent and executed. Through persistent storing, the transaction may enter a persistent consensus state. Through execution, the transaction may enter an executed state. If either a persistent storing process or an execution process is faulty (e.g., persistent storing may fail or execution may encounter an error), the transaction returns to a to-be-processed state, and processing is performed again. As shown in FIG. 4, when it is determined that sufficient nodes have completed persistent storing and execution of the transaction, the transaction enters a confirmable state. The nodes may send a confirmation message for the transaction to the user. Subsequently, when there are sufficient confirmable transactions, the transaction and other confirmed transactions are written together into a block.

In summary, consensus is initiated in batches, and a flow execution result is summarized in subbatches with fewer transactions to confirm a transaction, thereby reducing a consensus wait time, an execution wait time, and a confirmation wait time of a transaction. The transaction confirmation delay may be significantly reduced. In addition, since persistent storing and transaction execution can be processed in parallel, persistence overheads can be concealed, thereby reducing the impact of a small batch of consensus on the TPS of a platform and ensuring TPS performance of the platform.

In some embodiments, a transaction confirmation apparatus in a blockchain network is provided. The apparatus may be deployed in any first node in multiple nodes included in the blockchain network. The first node may be embodied as any device, platform or device cluster having computing and processing capabilities to function as a blockchain node. In addition, the first node can keep a persistent consensus list, a flow execution list, and a largest confirmation list. The persistent consensus list is used to record largest batch information for which each of the nodes completes persistent storing for a transaction batch on which consensus is reached. The flow execution list is used to record an execution result by each node of a transaction subbatch in the transaction batch on which consensus is reached. The largest confirmation list is used to record largest subbatch information confirmed in a current node. FIG. 7 is a schematic of an example transaction confirmation apparatus in a node, according to some embodiments of this specification. As shown in FIG. 7, the apparatus 700 can include a reading unit 71, a quantity determining unit 72, and a transaction confirmation unit 73.

The reading unit 71 can be configured to read a current largest subbatch from the largest confirmation list in response to detecting a trigger event. The trigger event is an event causing the persistent consensus list or the flow execution list to change.

The quantity determining unit 72 can be configured to sequentially use a subbatch following the current largest subbatch as a target subbatch, determine, based on the flow execution list, a first quantity of nodes that generate consistent execution results for the target subbatch, and determine, based on the persistent consensus list, a second quantity of nodes that complete persistent storing for a target batch to which the target subbatch belongs.

The transaction confirmation unit 73 can be configured to determine transactions in the target subbatch as confirmable transactions when the first quantity and the second quantity both meet a consensus fault tolerance quantity corresponding to the N nodes, and update the current largest subbatch with the target subbatch.

In some embodiments, the trigger event includes receiving a first message from another node, where the first message indicates updated largest transaction batch information for which the other node completes persistent storing; and largest transaction batch information corresponding to the other node is updated in the persistent consensus list in response to the first message.

In some embodiments, the trigger event includes receiving a second message from another node. The second message indicates an execution result of a newly added transaction subbatch by the other node. The execution result of the newly added transaction subbatch is added to the flow execution list in response to the second message.

In some embodiments, the persistent consensus list includes a first entry corresponding to the first node, and the apparatus further includes a consensus acquisition unit and a transaction processing unit (not shown).

The consensus acquisition unit can be configured to acquire, from a volatile storage, a first batch on which consensus is reached, The first batch is a next transaction batch following a batch recorded in the first entry.

The transaction processing unit can be configured to initiate persistent storing on the first batch, and add transactions in the first batch to an execution queue for sequential execution to generate a subbatch execution result.

In some embodiments, the trigger event includes updating records in the first entry with the first batch when the transaction processing unit completes the persistent storing of the first batch.

In some embodiments, the apparatus 700 may further include a first broadcast unit (not shown). The first broadcast unit is configured to broadcast a third message to other nodes of the N nodes after the trigger event is detected. The third message indicates that the largest transaction batch for which the first node completes persistent storing is updated to the first batch.

In some embodiments, the flow execution list includes a second entry corresponding to the first node, and the trigger event includes adding a first execution result of a first subbatch in the first batch to the second entry when the first execution result is generated.

In some embodiments, the apparatus 700 may further include a second broadcast unit (not shown). The second broadcast unit is configured to broadcast a fourth message to other nodes of the N nodes after the trigger event is detected. The fourth message indicates the first execution result generated by the first node for the first subbatch.

In some embodiments, the execution result of the transaction subbatch includes a hash value of the execution result of the transaction subbatch.

In some embodiments, the largest batch information is the largest batch number. The quantity determining unit 72 is configured to determine, as the second quantity in the persistent consensus list, a quantity of nodes whose batch numbers are among multiple largest batch numbers respectively corresponding to the multiple nodes that are greater than or equal to a batch number of the target batch.

In some embodiments, the apparatus 700 further includes a notification unit 74, The notification unit 74 is configured to determine, for any first transaction in the target subbatch, whether the first transaction is a local transaction. The local transaction is a transaction received by the first node from a user client. In some embodiments, the notification unit 74 is configured to: if the first transaction is a local transaction, determine a first user client corresponding to the first transaction, and send a first confirmation message to the first user client. The first confirmation message is used to indicate that the first transaction has been accurately executed.

In some embodiments, the first confirmation message includes a transaction identifier of the first transaction, execution results of all transactions in the target subbatch, and signatures of the nodes of the first quantity.

In some embodiments, a quantity of transactions in the transaction batch is less than a quantity of transactions included in one block. In some embodiments, the apparatus 700 further includes a block forming unit (not shown). The block form unit is configured to form a block based on the plurality of transaction batches when all transactions in a plurality of transaction batches are determined as confirmable transactions.

As shown in the apparatus 700, a transaction confirmation delay can be reduced, and TPS performance of the platform can be ensured.

Embodiments of this specification further provide a computer-readable storage medium storing computer executable instructions. The computer executable instructions, when executed by a processor, can cause the processor to perform the methods and the operations of the embodiments described herein.

The computer-readable medium includes a volatile medium and a non-volatile medium, a removable medium and a non-removable medium, which may implement storage of information by using any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer readable medium does not include transitory computer readable media (transitory media), such as a modulated data signal and a carrier.

In some embodiments, a computing device is further provided. The computing device includes a memory and a processor, The memory stores an executable code. The processor, when executing the executable code, can implement the foregoing described methods.

It may be learned from description of the foregoing implementations that, a person skilled in the art may clearly understand that the embodiments of this specification may be implemented by using software in addition to a necessary universal hardware platform. Based on such an understanding, the technical solutions of the embodiments of this specification essentially or the part contributing to the existing technologies may be implemented in a form of a software product. The computer software product may be stored in a storage medium, such as a ROM/RAM, a hard disk, or an optical disc, and includes a plurality of instructions for instructing a computer device (which may be a personal computer, a server, or a network device) to perform the methods described in the embodiments or some parts of the embodiments of this specification.

In this specification, the embodiments are described in a progressive manner Reference may be made to each other for the same or a similar part of the embodiments. Each embodiment focuses on a difference from other embodiments. Especially, apparatus and device embodiments are basically similar to a method embodiment, and therefore are described briefly; for related parts, refer to partial descriptions in the method embodiment. The method embodiment described above is merely an example. The modules described as separate parts may or may not be physically separate. During implementation of the solutions of the embodiments of this specification, the function of the modules may be implemented in the same piece of or a plurality of pieces of software and/or hardware. A part or all of the modules may be selected according to actual needs to achieve the objectives of the solutions of the embodiments. A person of ordinary skill in the art may understand and implement this specification without creative efforts.

It is appreciated that specific embodiments of this specification are described above. Other embodiments fall within the scope of the appended claims. In some cases, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

It is appreciated that an element described in a singular form herein or displayed only one in the accompanying drawings does not represent that the element is limited to one. In addition, modules or elements described or shown as separate herein may be combined into a single module or element, and a module or an element described or shown herein as a single module or element may be split into a plurality of modules or elements.

It is appreciated that the terms and expression manners used herein are merely for description, and one or more embodiments of this specification should not be limited to these terms and expressions. The use of these terms and expressions does not mean to exclude any equivalent features of the illustration and description (or part of them), and it should be understood that various modifications that may exist should also be included in the scope of claims. Other modifications, changes, and replacements may also exist. Accordingly, the claims should be considered as covering all these equivalents.

It is appreciated that although the descriptions are made with reference to current specific embodiments, a person of ordinary skill in the art should understand that the foregoing embodiments are only used for illustrating one or more embodiments of this specification. Various equivalent changes or substitutions may be made without departing from the spirit of this application. Therefore, changes and modifications to the foregoing embodiments within the essential spirit of this application shall fall into the scope of the claims of this application.

What is claimed is:

1. A method for transaction confirmation in a blockchain network implemented by a first node of multiple nodes in the blockchain network, the method comprising:

detecting, by the first node, an event indicating that one of the multiple nodes has persistently stored a batch of transactions or executed a subbatch of transactions, wherein the subbatch includes a smaller number of transactions than the batch;

in response to detecting, by the first node, the event:

determining, by the first node, a current latest subbatch from subbatches of transactions in the first node for which the multiple nodes have confirmed;

determining, by the first node, a target subbatch according to the current latest subbatch;

determining, by the first node, a first quantity of the multiple nodes that have generated execution results that are consistent with an execution result of the target subbatch in the first node;

determining, by the first node, a second quantity of the multiple nodes that have persistently stored a target batch to which the target subbatch belongs, wherein the target subbatch includes a smaller number of transactions than the target batch; and in response to the first quantity and the second quantity both meeting a consensus fault tolerance:

determining, by the first node, that transactions in the target subbatch are confirmable transactions.

2. The method according to claim 1, wherein the first node includes a persistent consensus list, a flow execution list, and a largest confirmation list, the persistent consensus list records latest batch information of a persistently stored transaction batch in each of the multiple nodes, the flow execution list records, for each of the multiple nodes, an execution result of a transaction subbatch in a transaction batch on which a consensus is reached, and the largest confirmation list records latest subbatch information confirmed in the first node.

3. The method according to claim 2, further comprising:

in response to the first quantity and the second quantity both meeting the consensus fault tolerance, updating the current latest subbatch with the target subbatch.

4. The method according to claim 2, wherein the event comprises receiving a first message from another node in the multiple nodes, the first message includes latest transaction batch information for which the other node completes persistent storing, and the method further comprises:

updating the persistent consensus list with the latest transaction batch information in the first message.

5. The method according to claim 2, wherein the event comprises receiving a second message from another node of the multiple nodes, wherein the second message includes an execution result of a newly added transaction subbatch by the other node, and the method further comprises:

updating the flow execution list with the execution result of the newly added transaction subbatch in the second message.

6. The method according to claim 2, wherein the persistent consensus list comprises a first entry corresponding to the first node, and the method further comprises:

acquiring, from a volatile storage of the first node, a first batch on which a consensus is reached, wherein the first batch is a next transaction batch following a batch recorded in the first entry;

initiate persistent storing on the first batch; and adding transactions in the first batch to an execution queue.

7. The method according to claim 6, wherein the event comprises updating records in the first entry with the first batch in response to the persistent storing of the first batch being completed.

8. The method according to claim 7, further comprising:

broadcasting a third message to one or more other nodes of the multiple nodes in response to the event being detected, wherein the third message includes information on the first batch for the one or more other nodes to update persistent consensus lists in the one or more other nodes.

9. The method according to claim 6, wherein the flow execution list comprises a second entry corresponding to the first node, and the event comprises adding a first execution result of a first subbatch in the first batch to the second entry when the first execution result is generated.

10. The method according to claim 9, further comprising:

broadcasting a fourth message to one or more other nodes of the multiple nodes in response to the event being detected, wherein the fourth message includes information on the first execution result for the one or more other nodes to update flow execution results in the one or more other nodes.

11. The method according to claim 2, wherein the latest batch information is the largest batch number, and the determining a second quantity of the multiple nodes that have persistently stored a target batch to which the target subbatch belongs comprises:

based on the persistent consensus list, determining, as the second quantity, a quantity of nodes whose largest batch numbers are greater than or equal to a batch number of the target batch.

12. The method according to claim 2, wherein a quantity of transactions in the transaction batch is less than a quantity of transactions included in one block, and the method further comprises:

in response to all transactions in a plurality of transaction batches are determined as confirmable transactions, forming a block based on the plurality of transaction batches.

13. The method according to claim 1, wherein the execution result of the target subbatch comprises a hash value of the execution result of the target subbatch.

14. The method according to claim 1, wherein in response to determining that transactions in the target subbatch are confirmable transactions, the method further comprises:

for any first transaction in the target subbatch, determining whether the first transaction is a local transaction, wherein the local transaction is a transaction directly received by the first node from a user client; and in response to a determination that the first transaction is a local transaction:

determining a first user client corresponding to the first transaction, and sending a first confirmation message to the first user client, wherein the first confirmation message is used to indicate that the first transaction has been accurately executed.

15. The method according to claim 14, wherein the first confirmation message comprises a transaction identifier of the first transaction, execution results of all transactions in the target subbatch, and signatures of the nodes of the first quantity.

16. A system comprising one or more processors and one or more non-transitory computer-readable memories coupled to the one or more processors and configured with instructions executable by the one or more processors to cause the system to perform operations in a blockchain network implemented by a first node of multiple nodes in the blockchain network, the operations comprising:

detecting an event indicating that one of the multiple nodes has persistently stored a batch of transactions or executed a subbatch of transactions, wherein the subbatch includes a smaller number of transactions than the batch;

in response to detecting the event:

determining a current latest subbatch from subbatches of transactions in the first node for which the multiple nodes have confirmed;

determining a target subbatch according to the current latest subbatch;

determining a first quantity of the multiple nodes that have generated execution results that are consistent with an execution result of the target subbatch in the first node;

determining a second quantity of the multiple nodes that have persistently stored a target batch to which the target subbatch belongs, wherein the target subbatch includes a smaller number of transactions than the target batch; and in response to the first quantity and the second quantity both meeting a consensus fault tolerance:

determining that transactions in the target subbatch are confirmable transactions.

17. The system according to claim 16, wherein the first node includes a persistent consensus list, a flow execution list, and a largest confirmation list, the persistent consensus list records latest batch information of a persistently stored transaction batch in each of the multiple nodes, the flow execution list records, for each of the multiple nodes, an execution result of a transaction subbatch in a transaction batch on which a consensus is reached, and the largest confirmation list records latest subbatch information confirmed in the first node.

18. The system according to claim 17, wherein the operations further comprise:

in response to the first quantity and the second quantity both meeting the consensus fault tolerance, updating the current latest subbatch with the target subbatch.

19. The system according to claim 16, wherein in response to determining that transactions in the target subbatch are confirmable transactions, the operations further comprise:

for any first transaction in the target subbatch, determining whether the first transaction is a local transaction, wherein the local transaction is a transaction directly received by the first node from a user client; and in response to a determination that the first transaction is a local transaction:

determining a first user client corresponding to the first transaction, and sending a first confirmation message to the first user client, wherein the first confirmation message is used to indicate that the first transaction has been accurately executed.

20. One or more non-transitory computer-readable storage media storing instructions executable by one or more processors, wherein execution of the instructions causes the one or more processors to perform operations in a blockchain network implemented by a first node of multiple nodes in the blockchain network, the operations comprising:

detecting an event indicating that one of the multiple nodes has persistently stored a batch of transactions or executed a subbatch of transactions, wherein the subbatch includes a smaller number of transactions than the batch;

in response to detecting the event:

determining a current latest subbatch of subbatches of transactions for which the multiple nodes have confirmed;

determining a target subbatch according to the current latest subbatch;

determining a first quantity of the multiple nodes that have generated execution results that are consistent with an execution result of the target subbatch in the first node;

determining a second quantity of the multiple nodes that have persistently stored a target batch to which the target subbatch belongs, wherein the target subbatch includes a smaller number of transactions than the target batch; and in response to the first quantity and the second quantity both meeting a consensus fault tolerance:

determining that transactions in the target subbatch are confirmable transactions.

* * * * *